United States Patent [19]

Wang et al.

[11] Patent Number: 5,726,723
[45] Date of Patent: Mar. 10, 1998

[54] SUB-TWISTED NEMATIC LIQUID CRYSTAL DISPLAY

[75] Inventors: Xin-Jiu Wang; Qi-Feng Zhou, both of Beijing, China

[73] Assignee: Technology Research International Corporation, Alpharetta, Ga.

[21] Appl. No.: 594,905

[22] Filed: Jan. 31, 1996

[51] Int. Cl.⁶ .................. G02F 1/133; G02F 1/1347; G02F 1/13
[52] U.S. Cl. .................. 349/75; 349/73; 349/74; 349/78; 349/181; 349/186
[58] Field of Search .................. 359/53, 40, 73, 359/94, 70; 349/73–75, 78, 181, 186

[56] References Cited

U.S. PATENT DOCUMENTS

| | | | |
|---|---|---|---|
| 3,914,022 | 10/1975 | Kashnow | 350/160 |
| 3,947,185 | 3/1976 | Maezawa | 350/160 |
| 4,039,252 | 8/1977 | Mizuno et al. | 350/160 |
| 4,257,682 | 3/1981 | Suzuki et al. | 350/349 |
| 4,426,133 | 1/1984 | Funada et al. | 350/334 |
| 4,609,255 | 9/1986 | Leenhouts et al. | 350/341 |
| 4,896,947 | 1/1990 | Leenhouts | 350/337 |
| 4,941,737 | 7/1990 | Kimura | 350/335 |
| 4,952,030 | 8/1990 | Nakagawa et al. | 350/337 |
| 5,042,921 | 8/1991 | Sato et al. | 359/40 |
| 5,105,289 | 4/1992 | Sonehara et al. | 359/70 |
| 5,126,869 | 6/1992 | Lipchak et al. | 359/94 |
| 5,155,608 | 10/1992 | Hatano | 359/53 |
| 5,249,070 | 9/1993 | Takano | 359/54 |
| 5,287,207 | 2/1994 | Mulkens et al. | 359/73 |
| 5,361,151 | 11/1994 | Sonehara et al. | |
| 5,400,158 | 3/1995 | Ohnishi et al. | 359/73 |
| 5,568,283 | 10/1996 | Mitsutake et al. | 359/53 |

*Primary Examiner*—William L. Sikes
*Assistant Examiner*—Julie Ngo
*Attorney, Agent, or Firm*—Arnall Golden & Gregory

[57] ABSTRACT

A sub-twisted nematic liquid crystal display (SBTN-LCD) device (30) having a liquid crystal layer (34) characterized as a polarization rotator below an optical threshold voltage, a half-wavelength plate at approximately a saturation voltage, and a transparent layer above the saturation voltage. The twist angle of the liquid crystal layer is between 46°–89°, preferably about 55°. The product of the birefringence of the liquid crystal and the thickness of the liquid crystal layer ($\Delta nd$) is in the range of 0.35–0.70 µm, and preferably about 0.52 µm for the 55° twist. One polarizing layer (42) is applied to the liquid crystal device with the polarization direction either parallel or perpendicular to the immediately neighboring liquid crystal director. Further, the performance of the SBTN-LCD is dependent upon the parameters of the liquid crystal material, such as the elastic constants.

22 Claims, 7 Drawing Sheets

SUB-TWISTED NEMATIC LIQUID CRYSTAL DISPLAY

FIELD OF THE INVENTION

The present invention generally relates to nematic liquid crystal displays, and more particularly, to a sub-twisted nematic liquid crystal display.

BACKGROUND OF THE INVENTION

In recent years, advancements in technology have brought about the development of numerous display types for use in applications that vary from wrist watches to notebook computer color displays. One of the most efficient and widely used display types is a liquid crystal display. Liquid crystal displays utilize the ability to specifically control, or modulate, visible light in order to produce images. There are essentially three types of liquid crystal materials: nematic, smectic, and cholesteric. In general, liquid crystal molecules which comprise the liquid crystal material are elongated or cigar-shaped structures having electro-optic properties that make them favorable for use in displays. By way of example, a type of nematic liquid crystal referred to as twisted nematic is widely used in numerous photonic applications and generally operates in the following manner.

With reference to FIGS. 1A and 1B, a twisted nematic liquid crystal cell 10 typically comprises a liquid crystal layer 12 of twisted nematic liquid crystals. The liquid crystal layer 12 is sandwiched between two orientation layers 14, 16 which impart a twist on the alignment of the liquid crystal molecules in the liquid crystal layer 12. As shown in FIG. 1A, orientation layers 14, 16 essentially act as directors which align the liquid crystals immediately adjacent to the orientation layer in a specific direction defined by microscopic grooves formed in the orientation layers via rubbing or any one of several other well known suitable methods. Accordingly, the liquid crystal molecules adjacent to orientation layer 14 and the liquid crystal molecules adjacent orientation layer 16 are oriented at a 90° offset or twist within liquid crystal layer 12. This angle is specifically referred to as the twist angle.

Disposed adjacent to either orientation layer 14, 16 are conductive electrode layers 18, 19 for applying an electric field across liquid crystal layer 12. Electrodes 18, 19 are transparent layers, preferably comprising indium tin oxide (ITO). Disposed adjacent to the outside surface of respective electrodes 18, 19 are polarizing layers 20, 22 for filtering so that incident light 24 is linearly polarized before entering liquid crystal layer 12 by polarizing layer 20 and so that only light exiting liquid crystal layer 12 that is polarized in the direction of polarizing layer 22 passes through layer 22 as transmitted light 26.

In the field-off state, as shown in FIG. 1A, the liquid crystal layer 12 acts as an optical rotator that rotates the linearly polarized light 90° as it passes through liquid crystal layer 12. Consequently, the light exiting liquid crystal layer 12 is polarized in the direction of polarizing layer 22 so that it can pass through polarizing layer 22 as transmitted light 26, causing the display to appear white or bright.

When a steady, or low frequency, electric field is applied across electrodes 18, 19, as shown in FIG. 1B, the liquid crystal molecules rotate in the direction of the field so as to reduce the free electrostatic energy. In this state, the linearly polarized light entering the liquid crystal layer 12 is transmitted without rotation, and consequently, will not pass through polarizer 22. Consequently, no light is transmitted and the display appears dark.

A liquid crystal layer 12 that imposes a 90° twist upon the light transmitted therethrough is referred to as a twisted nematic liquid crystal display (TN-LCD). Alternatively, a liquid crystal layer 12 that imposes a 180°–270° twist upon the light transmitted therethrough is referred to as a super-twisted nematic liquid crystal display (STN-LCD). The advantages and disadvantages of either configuration are discussed in greater detail below.

The above described liquid crystal display configuration is referred to as a transmissive device. Other operational types of liquid crystal devices are reflective and transflective. Generally, a transmissive liquid crystal display includes an artificial light source placed behind the rear surface of the display so that its energy, referred to above as incident light 24, is directed through the display to the front viewing surface. In a reflective liquid crystal display, there is no artificial source of light but, instead, a reflective layer is placed behind the rear surface of the display so as to redirect ambient light towards the front viewing surface. A transflective liquid crystal display is a combination of both transmissive and reflective. In a transflective liquid crystal display, both ambient and artificial light sources are utilized.

Further, the above described liquid crystal display configuration operates as a positive mode display. In a positive operation mode, the viewing surface appears bright in an unactuated state, i.e., the applied voltage is equal to zero. This is also referred to as a black on white background display. Conversely, in a negative operation mode, the viewing surface is normally dark in an unactuated state. In an actuated state, i.e., with an applied voltage above the saturation voltage, the display appears white. This is referred to as a white on black background display.

The TN-LCD was discovered in 1971 and has been widely used in low-end LCD applications, such as in wrist watches, clocks and instruments. The advantages of TN-LCDs include simple processing techniques, low production cost, and W/B displays that are convertible into full-color displays by means of mosaic RBG color filters. A particular disadvantage of TN-LCDs is their relatively smooth electrooptical curve, which renders them less multiplexible than STN-LCDs. For example, the multiplexing lines of a TN-LCD are conventionally less than approximately 36.

The STN-LCD was discovered in 1983 and has found wide use in high-end products such as notebook computer color displays because, inter alia, their steep electro-optical curve enables them to be highly multiplexible. For example, depending upon the twist angle, STN-LCDs can readily work beyond 100 multiplexing lines. In fact, the more the twist, the higher the multiplexing that can be achieved. However, several of the disadvantages of STN-LCDs are as follows: STN-LCDs require sophisticated processing techniques that have low processing margins; STN-LCDs have higher production cost than TN-LCDs; and STN-LCDs operate in blue or yellow mode which make their application to full-color displays more difficult. Particularly, in order to operate in a W/B mode or full-color mode, a STN-LCD must have a double cell configuration or must include retardation film.

In order to overcome some of the disadvantages associated with STN-LCDs without sacrificing performance, it has been found that a liquid crystal device can be operated as a half-wavelength plate rather than as an optical rotator. This essentially reduces the complexity of the device by requiring only one polarizing layer rather than two. An apparent advantage of such a configuration is that the device is more light efficient than those requiring two polarization layers. Illustrative of such a device is the patent to Sonehara et al., U.S. Pat. No. 5,105,289. The device disclosed in the patent to Sonehara et al. is a reflection type device configured to operate in a negative mode. Said patent discloses a preferred twist angle of 63° and a Δnd (a product of the birefringence Δn and liquid crystal layer thickness d) of between 0.33λ and 0.47λ, where λ is the wavelength of the incident light. Further, the liquid crystal layer is stated as preferably being 2.5 μm thick in an optimal configuration where Δnd equals 0.2. However, a liquid crystal layer having a thickness of 2.5 μm requires stringent manufacturing control, and therefore, is undesirable in most applications because current processing techniques would make it difficult and/or costly to achieve good uniformity of the respective layers over the area of the display. Moreover, a liquid crystal layer at that thickness results in an undesirably narrow production margin. For example, with a five percent change of intensity at the field-off state, the product Δnd can only be varied approximately 0.06 μm.

Accordingly, a heretofore unaddressed need exists for a liquid crystal display that offers the advantages of requiring only one polarizing layer and that can be operated as a W/B mode display or a full-color display without requiring the sophisticated processing associated with STN-LCD and half-wavelength plate LCD configurations.

SUMMARY OF THE INVENTION

An object of the present invention is to overcome the deficiencies and inadequacies in the prior art as described above and as generally known in the industry.

Another object of the present invention is to provide a nematic liquid crystal display device that requires only one polarizing layer so as to reduce optical loss.

Another object of the present invention is to provide a nematic liquid crystal display device having relatively low production cost.

Another object of the present invention is to provide a nematic liquid crystal display device that is more multiplexible than TN-LCDs and that is adaptable as both a W/B mode display and a full-color display.

Another object of the present invention is to provide a nematic liquid crystal display device in which the liquid crystal operates as an optical rotator in one state and a half-wavelength plate in another state.

Another object of the present invention is to provide a nematic crystal display device having a margin of processing of approximately 0.25 μm for the product Δnd.

Another object of the present invention is to provide a liquid crystal display device that does not require active chiral dopants in order to avoid the anti-desired twist or to maintain a super-twist configuration.

Briefly stated, this invention is a sub-twisted nematic liquid crystal display (SBTN-LCD) that can operate as a negative or positive mode display in either a reflective or transmissive configured display. The basic configuration of a SBTN-LCD in accordance with the present invention includes a liquid crystal layer characterized as an optical rotator below an optical threshold voltage, a half-wavelength plate at approximately a saturation voltage, and a transparent layer above the saturation voltage. The SBTN-LCD device further includes the following: two transparent, conductive electrode layers sandwiching the liquid crystal layer so as to create an electric field across the liquid crystal layer when a voltage is applied thereto; two orientation layers positioned between respective electrodes and the liquid crystal layer, for imparting a twist angle on the liquid crystal molecules comprising the liquid crystal layer; and a reflective layer positioned at the back side of the liquid crystal device for redirecting light through the liquid crystal layer to the front or viewing surface of the display device. Lastly, the SBTN-LCD device includes one polarizing layer positioned adjacent the electrode layer at the front of the device for converting incident light into linearly polarized light.

In the preferred embodiment of the present invention, the twist of the liquid crystal layer is approximately 55°, though this is somewhat dependent upon the liquid crystal material parameters, such as the elastic constants. With a 55° twist angle, the product Δnd is approximately 0.52 μm. A SBTN-LCD so configured is highly suitable for use as a moderate-end multiplexing display. Further, because the present invention requires only one polarizing layer, it is optically efficient and effectively suppresses ghost shadows by allowing the reflective layer to be positioned adjacent the inside surface of the rear substrate.

An alternative embodiment of the present invention is a SBTN-LCD operating as a negative mode display. The negative mode display is achieved by placing a beam splitter adjacent to the viewing surface of a SBTN-LCD in accordance with the preferred embodiment of the present invention.

Another alternative embodiment of the present invention is a SBTN-LCD operation as a color display. The color display device is achieved by incorporating color filters either adjacent the reflective layer for a passive display or adjacent the inside surface of a front glass plate for an active matrix display. The color filters preferably comprise RBG mosaic patterns.

Another alternative embodiment of the present invention is a frontlight SBTN-LCD operating in a reflective mode. This is achieved by adding a frontlight film adjacent the polarizer at the viewing surface of the device. This configuration is particularly well suited for use as a color display in a notebook computer because of its energy efficiency.

Yet another alternative embodiment of the present invention is a SBTN-LCD operating in a transmissive mode. This is achieved via a double LCD configuration utilizing two substantially identical liquid crystal layers having opposite sense of twist. The device operates as a positive mode display if the directions of the two polarizers are parallel or as a negative mode display if the directions of the polarizers are perpendicular.

Other objects, features, and advantages of the present invention will become apparent from the following description when considered in conjunction with the accompanying drawings. All such additional objects, features, and advantages are intended to be included herein.

BRIEF DESCRIPTION OF THE DRAWINGS

The present invention, as described in the claims, can be better understood with reference to the following drawings. The drawings are not necessarily to scale, emphasis instead being placed upon clearly illustrating the principles of the present invention. Moreover, like reference numerals designate corresponding parts throughout the several views.

DETAILED DESCRIPTION OF PREFERRED EMBODIMENTS

Figure 2:
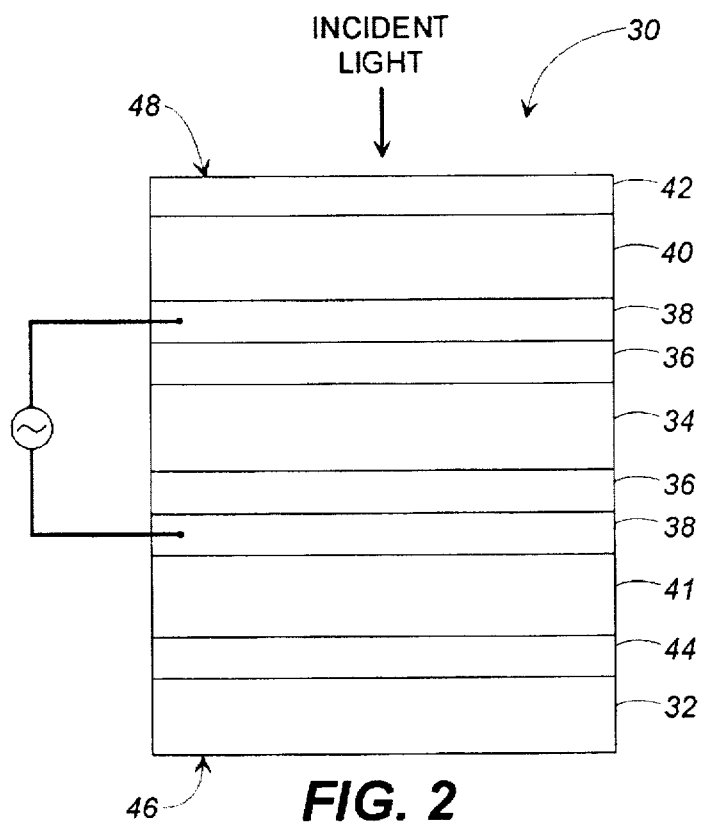
FIG. 2 is a plan view of the structural layers forming a SBTN-LCD device in accordance with the present invention and configured for reflective mode operation.

Referring now to the drawings where the illustrations are for the purpose of describing preferred embodiments of the present invention and are not intended to limit the invention described herein, FIG. 2 illustrates a sub-twisted nematic liquid crystal display (SBTN-LCD) device 30 configured in accordance with the present invention. The liquid crystal device 30 is preferably constructed on a substrate 32, such as a glass plate or silicon wafer, though a substrate is not essential to the operation of device 30 as can be appreciated by one of ordinary skill in the art. The liquid crystal device 30 includes a liquid crystal layer 34 sandwiched between two orientation layers 36. Each orientation layer 36 includes a plurality of parallel microscopic grooves that act as directors to orientate the immediately adjacent liquid crystal molecules of liquid crystal layer 34 in the direction of the grooves. By incorporating an angular offset in the direction of the grooves of the respective orientation layers 36, a twist is imparted on the molecules of liquid crystal layer 34, referred to as the twist angle. The twist angle of the liquid crystal layer 34 of the present invention is approximately between 46°–89°, preferably about 55°, though this value is somewhat dependent upon the liquid crystal material parameters, such as the elastic constants, as will be discussed in greater detail below. Because the twist angle of the present invention is less than 90°, no dopants are required to avoid the anti-desired twist or to maintain a super-twist configuration, as commonly required in other nematic liquid crystal devices.

Two optically transparent and electrically conductive electrodes 38 sandwich orientation layers 36 and liquid crystal layer 34 so that when a voltage difference is applied across electrodes 38, an electric field is present across liquid crystal layer 34. In the preferred embodiment, electrodes 38 comprise indium tin oxide (ITO). Further, disposed on either side of the described structure are a front glass plate 40 and rear glass plate 41 that confine the liquid crystal layer 34 and orientation layers 36. Preferably, each ITO forming electrode 38 is coated onto the inside surface (i.e., the surface adjacent to electrode 38) of respective glass plates 40, 41. The rear glass plate 41 is positioned at the back (or rear) surface 46 of the device and can, in some applications, be replaced by other material layers such as a dielectric mirror, a thin film transistor (TFT) matrix, or a silicon wafer with circuits.

A reflective layer 44 is positioned adjacent the back surface of rear glass plate 41, between plate 41 and substrate 32 (if present), in order to redirect incident light towards the viewing (or front) surface 48 of liquid crystal device 30. If the material comprising reflective layer 44 is electrically conductive, for instance aluminum (Al), then reflective layer 44 can be integrated with electrode 38 so as to reduce the number of layers comprising liquid crystal device 30. A similar integration of layers can be achieved by combining an orientation layer 36 with its respective electrode layer 38 by fabricating the grooves of orientation layer 36 in the material forming an electrode 38.

Lastly, a single polarizer 42 is positioned at the viewing surface 48 of liquid crystal device 30, adjacent the front glass plate 40. Polarizer 42 is orientated either parallel or perpendicular to the orientation of its neighboring liquid crystal molecules as defined by orientation layer 36. Because the present invention utilizes only one polarizer, liquid crystal device 30 is more light efficient than other nematic liquid crystal devices which require two polarizers. Specifically, in liquid crystal device 30, incident light need only pass through a polarizing layer (i.e., polarizer 42) twice, once entering and once exiting, whereas a device having two polarizing layers requires the incident light to pass through a polarizing layer four times, twice entering and twice exiting, each time increasing the optical loss of the device via energy absorption by the polarizer.

The aforementioned structure of a liquid crystal layer sandwiched between two orientation layers and two electrode layers is commonly referred to as a liquid crystal cell.

The liquid crystal device 30 is capable of operating as a passive type or active type display. An active type display is addressed by an active matrix that incorporates an active electronic element at each pixel, usually a TFT. A passive type display is addressed by a passive matrix that does not include an active electronic element at each pixel, and therefore, is easier to manufacture. However, the active matrix configuration is typically preferred because many more multiplexing lines can be addressed without the undesirable effect of cross-talk.

As described above, liquid crystal device 30 operates in a reflective mode as opposed to a transmissive mode or transflective mode. A reflective mode LCD is more commonly used in numerous LCD applications, and therefore, is preferable. However, the present invention is equally applicable to transmissive mode operation, as described in detail below as an alternative embodiment.

As a reflective type of display, liquid crystal device 30 provides several advantages, particularly when configured to operate as an active display. Particularly, the TFT matrix and the associated driving circuits for active operation can be fabricated underneath liquid crystal device 30 in rear glass plate 41 or substrate 32. By doing so, the aperture ratio of the liquid crystal display is effectively increased. For purposes of the present invention, the aperture ratio is defined as the ratio of real display area over the occupied area of the device.

Another feature of liquid crystal device 30 is that a temperature control device can be incorporated in the rear glass plate 41 or substrate 32 in order to control the temperature of liquid crystal layer 34 so as to prevent the liquid crystal mixture from solidifying or becoming isotropic. Yet another feature of liquid crystal device 30 is that a dielectric dichroic mirror can be incorporated in place of rear glass plate 41 and reflective layer 44 in order to make device 30 a monochromic display. Thus, by combining three monochromic displays having mirrors that reflect red, green and blue light respectively, a full color image display can be realized. Note, however, the product $\Delta nd$ must be adjusted in each display to the wavelength of the light being reflected.

Figure 3:
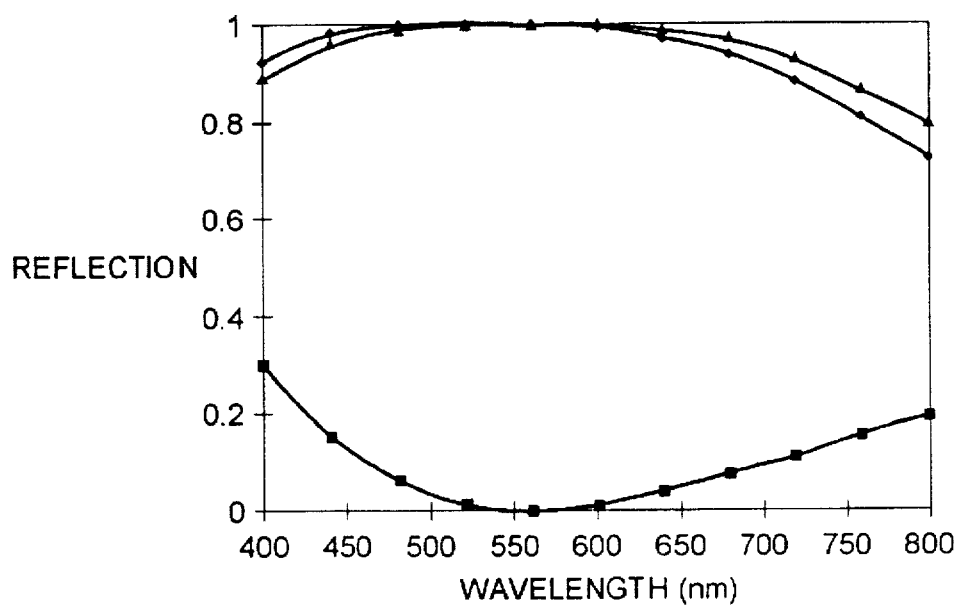
FIG. 3 is a graph of the on-state and off-state reflection versus the wavelength for the liquid crystal device of FIG. 2.

With reference to FIG. 3, the reflection dispersion of liquid crystal device 30 is graphically illustrated. In the field-off state, i.e., from zero volts (indicated by the curve denoted with triangles) to the optical threshold voltage (indicated by the curve denoted with diamonds), the display is bright. In the field-on state, i.e., at saturation voltage (indicated by the curve denoted with squares), the display is dark. Taking into account the human-eye response and the spectrum of white-light source, the display is a black on white background mode display. This mode of operation is often referred to as a positive mode display in contrast to a negative mode display in which the display is a white on black background. However, as previously mentioned a SBTN-LCD in accordance with the present invention can operate as a negative mode display if operated in conjunction with a polarizing beam splitter, as later discussed in detail as an alterative embodiment.

Figure 4:
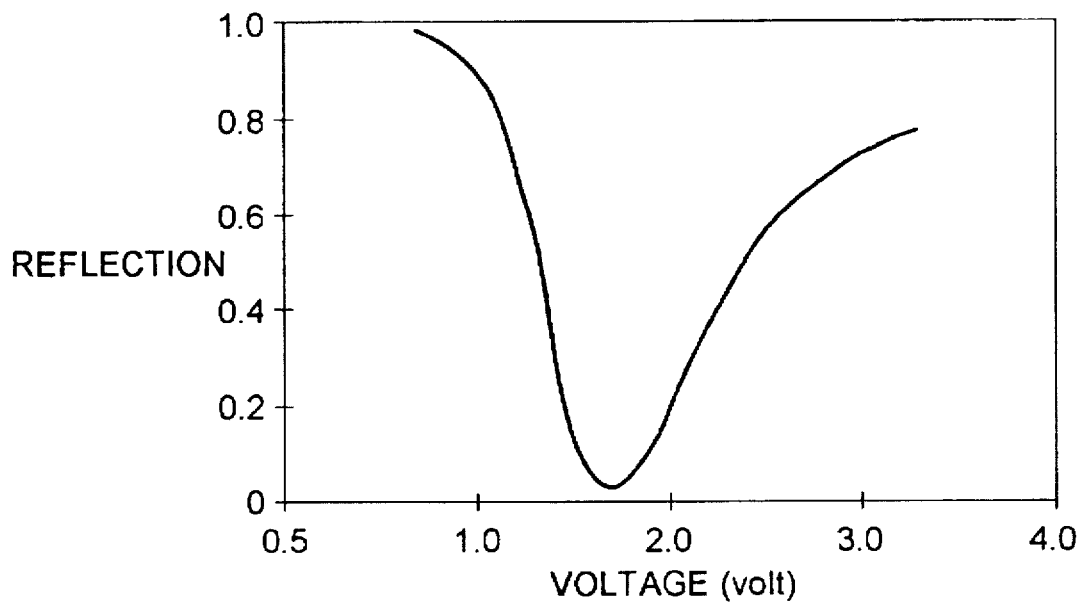
FIG. 4 is a graph of the operational characteristics of the liquid crystal device of FIG. 2 as a function of applied voltage.

The operational characteristics of liquid crystal device 30 are graphically illustrated in FIG. 4, wherein reflection is plotted against applied voltage. As evidenced by the graph, at approximately one volt, the reflectivity of the liquid crystal layer is approximately 1.0 but sharply decreases to approximately zero at 1.6 volts. This region is referred to as the electro-optic curve of the liquid crystal device 30. Worth noting is that the steepness of the electro-optic curve directly affects the multiplexing ability of the liquid crystal device. Specifically, the steeper the curve, the more multiplexing lines the device can drive.

Figure 5:
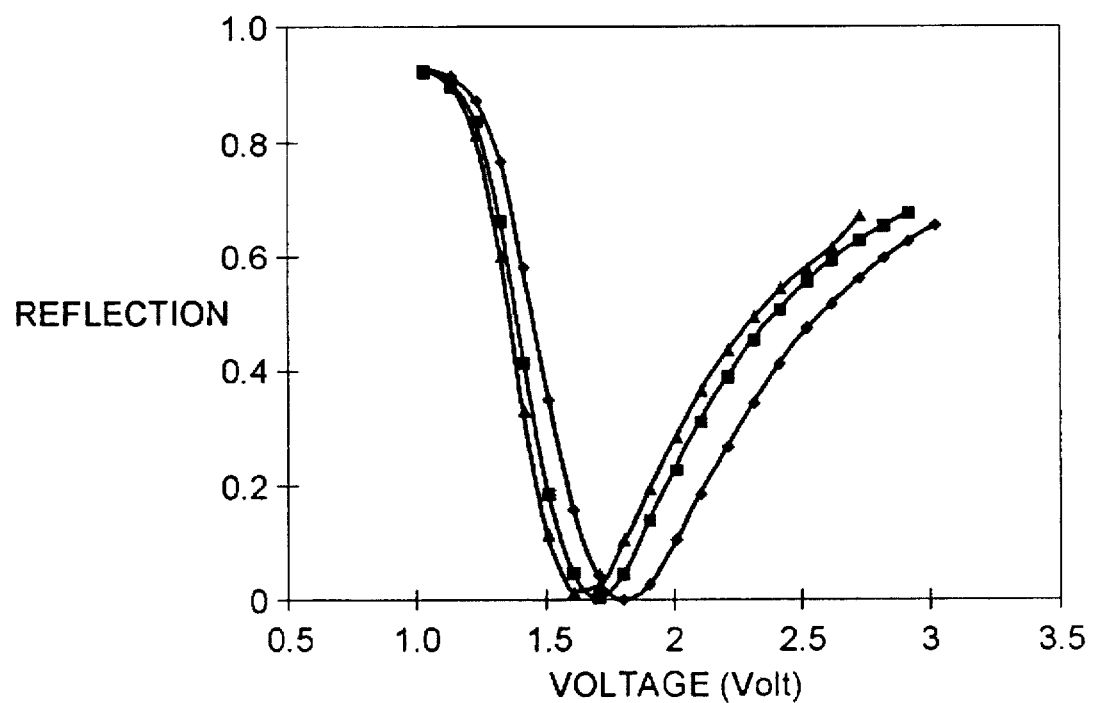
FIG. 5 is a graph of the operating characteristics for several liquid crystal devices constructed in accordance with FIG. 2 and having different elastic constance.

Accordingly, from approximately zero to the threshold voltage, the display is highly reflective and appears bright at the viewing surface. At the saturation voltage, that is the lowest point on the curve, essentially no light is emitted at the viewing surface, causing the display to appear dark. Thus, the image is black on a white background. In a preferred embodiment, as illustrated in FIGS. 4 and 5, the threshold voltage is approximately 1.2 volts and the saturation voltage is approximately 1.6 volts. However, these voltages change in accordance with the physical parameters of the liquid crystal material chosen for liquid crystal layer 34.

For example, FIG. 5 illustrates the electro-optical curves for liquid crystal device 30 having different liquid crystal materials with different elastic constants $K_{33}$. The elastic constants $K_{11}$, $K_{22}$, and $K_{33}$ associated with a liquid crystal material are equivalent to the modulus and stress-strain relation of solids. The elastic constants $K_{11}$, $K_{22}$, and $K_{33}$ are proportional constants for deformation force and deformation amplitude, where $K_{11}$ is the splay deformation, $K_{22}$ is the twist deformation, and $K_{33}$ is the bend deformation. In FIG. 5, the three curves illustrated represent elastic squares, and $1.1 \times 10^{-6}$ dyne denoted with triangles. As evidenced by FIG. 5, the saturation voltage varies according to the different liquid crystal material though the optical threshold voltage remains substantially the same. Thus, the multiplexing ability of a liquid crystal layer 34 can be varied by the choice of the liquid crystal material utilized. This means the multiplexing ability of the liquid crystal layer 34 can be specifically engineered for a specific application. As shown in FIG. 5, the lower the bend elastic constant $K_{33}$, the higher the multiplexing ability of the liquid crystal layer.

Further, by reducing the ratio of the bend elastic constant to splay elastic constant ($K_{33}/K_{11}$), and the ratio of the dielectric anisotropy to the perpendicular dielectric constant (($\epsilon_{\parallel}-\epsilon_{\perp})/\epsilon_{\perp}$), the liquid crystal layer 34 becomes even more multiplexible. The values of the aforementioned ratios depend upon the chemical formula and composition of the liquid crystal mixture. Different liquid crystal mixtures having different ratios are commercially available from various liquid crystal suppliers such as E Merck, located in Darmstadt, Germany, or F Hoffmann-La Roche, located in Basle, Switzerland. Presently, the lowest known values for the aforementioned ratios are about $K_{33}/K_{11}=0.6$ and $(\epsilon_{\parallel}-\epsilon_{\perp})/\epsilon_{\perp}=1.0$.

In defining a liquid crystal layer 34 in accordance with the present invention, the product $\Delta nd$ is within the range of 0.35 μm to 0.70 μm. In a preferred embodiment with a 55° twist angle, the $\Delta nd$ is equal to about 0.52 μm. However, as with the twist angle, the product $\Delta nd$ is dependent upon the liquid crystal material parameters, as discussed hereinbefore. The specific combination of twist angle and product $\Delta nd$ for the preferred embodiment of liquid crystal layer 34 is calculated in the following manner. Initially, given the relationship stated in equation (1) below, $$\left( \frac{\pi}{\phi} \right) \left( \frac{\Delta nd}{0.55} \right) = 1, \text{ where } \phi = \frac{(2M+1)\pi}{2\sqrt{2}} \tag{1}$$

where $\Phi$ is the twist angle and M=0 or 1, and the relationships of product $\Delta nd$ and twist angle as stated in equation (2) below, $$\Delta nd = 0.55 \sqrt{1 - \left( \frac{\phi}{\pi} \right)^2} \tag{2}$$

the Berremann 4×4 matrix can be applied to equations (1) and (2) to calculate the electro-optic performance in order to optimize the value which defines the twist angle. This value has been determined to be approximately 55°, depending slightly upon the elastic constants and other electric and optical parameters of the liquid crystal material. As determined by equation (2) and as previously stated, the preferred value for product $\Delta nd$ for a 55° twist angle is approximately 0.52 μm, for instance, where $\Delta n=0.1$ and d=5.2 μm.

Accordingly, the reflectivity of the liquid crystal device 30 in the field-off state can be graphically illustrated against multiple values of $\Delta nd$. This graph is governed by equation (3) below, $$\text{Reflectivity} = 1 - \left[ \left( \frac{2\alpha}{1+\alpha^2} \right) (\sin^2(\phi \sqrt{1+\alpha^2})) \right]^2, \text{ where } \alpha = \frac{\pi}{\phi} \cdot \frac{\Delta nd}{\lambda} \tag{3}$$

where $\lambda$ is the wavelength of the incident light.

Figure 6:
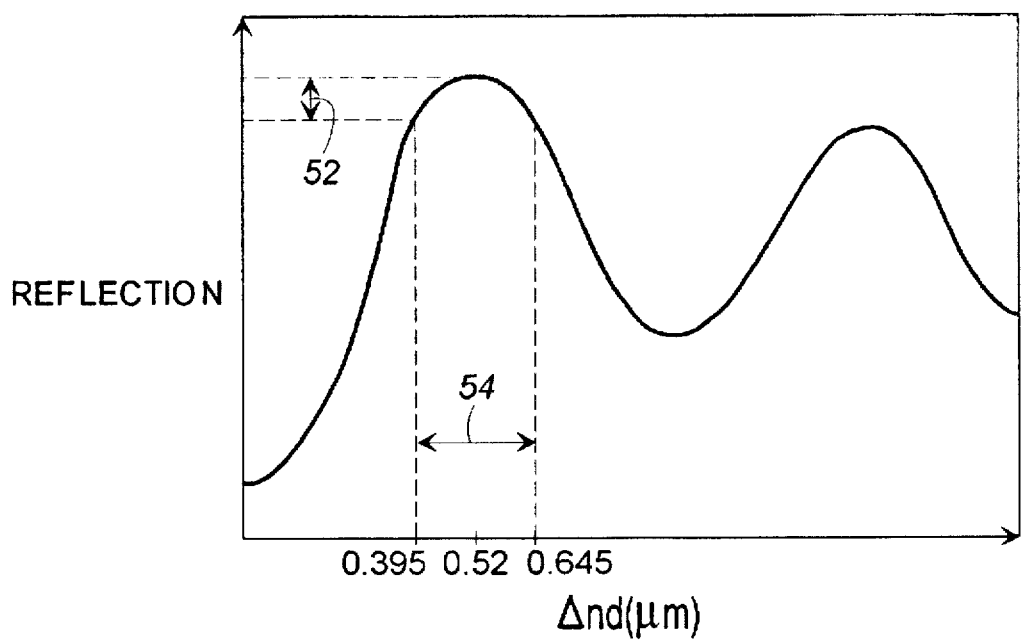
FIG. 6 is a graph illustrating the processing margin of the liquid crystal device of FIG. 2.

With reference to FIG. 6, the reflectivity of a liquid crystal device 30 having a twist angle 55° is plotted against changes in $\Delta nd$. For typical commercial liquid crystal products, the birefringence $\Delta n$ ranges from 0.08 to 0.25, and therefore, the thickness d of the liquid crystal layer 34 is between 2.08 μm and 6.5 μm. Hence, device 30 has a relatively large production margin. For instance, with a reflectivity change of approximately 5% in the field-off state, denoted by reference numeral 52, the product Δnd can be varied in a range of approximately 0.25 μm, or about ±0.125 μm from the preferred product Δnd of 0.52 μm. A production margin, denoted by reference numeral 54, of approximately 0.25 μm does not require the stringent manufacturing processes and techniques often associated with twisted nematic liquid crystal displays (TN-LCD's) having narrower production margins, such as the device disclosed in the patent to Sonehara et al. cited hereinbefore.

For example, for a twisted nematic liquid crystal device having a preferred Δnd of 0.2 μm, the liquid crystal layer thickness d is going to be between 0.8 μm and 2.5 μm, and the production margin is going to be approximately 0.06 μm for a reflectively change of 5% in the field-off state. Such a liquid crystal device is extremely difficult to produce with uniformity in the glass plate flatness and cell gap over the area of the display using conventional processes and techniques.

OPERATION

In the operation of liquid crystal device 30, incident light strikes the viewing surface 48, of liquid crystal device 30 and passes through polarizer 42. The incident light is converted to linearly polarized light with a polarization direction either parallel or perpendicular to the orientation of the liquid crystal director, i.e., orientation layer 36, on the front side of the device. The linearly polarized light passes unchanged through front glass plate 40, electrode 38, and orientation layer 36.

In the field-off state, the linearly polarized light is kept as linearly polarized light as it passes through liquid crystal layer 34. However, in liquid crystal layer 34, the polarization direction of the linearly polarized light is rotated along the direction of the liquid crystals, following the twist angle of liquid crystal layer 34. Thus, the polarization direction is rotated by the twist angle of liquid crystal layer 34. The liquid crystal layer 34, in essence, acts as an optical rotator of an angle equal to the twist angle. The linearly polarized light then passes unchanged through orientation layer 36, electrode layer 38, and rear glass plate 41 just as it did prior to entering liquid crystal layer 34. The linearly polarized light subsequently strikes reflective layer 44 and is redirected back towards the viewing surface of liquid crystal device 30. The reflective light again passes unchanged through the various layers up to liquid crystal layer 34 wherein the liquid crystal layer optically rotates the linearly polarized light back to its original polarization direction, the same as before entering the liquid crystal layer 34. Thus, the redirected light leaving liquid crystal layer 34 is polarized in a direction parallel with a polarization direction of polarizer 42, and therefore, passes through polarizer 42. Accordingly, the device appears bright at its viewing surface 48.

The aforementioned operation of liquid crystal layer 34 as an optical rotator can be analytically described using its Jones matrix. For example, as incident light passes through polarizer 42, the randomly polarized incident light becomes linearly polarized light $$\begin{pmatrix} \cos\alpha \\ \sin\alpha \end{pmatrix},$$

where α is the angle of the axis of polarizer 42. As previously stated, the polarizer 42 is orientated either parallel or perpendicular to the immediately adjacent liquid crystal director, and therefore, α=0° or 90°. Thus, the polarizer 42 turns the incident light into $$\begin{pmatrix} 0 \\ 1 \end{pmatrix} \text{ or } \begin{pmatrix} 1 \\ 0 \end{pmatrix}$$

for perpendicular and parallel orientations, respectively. For purposes of illustrating the present invention, in the following discussion will pertain only to the parallel configuration, i.e., $$\begin{pmatrix} 1 \\ 0 \end{pmatrix}.$$

Because of the designed values of twist angle and Δnd for liquid crystal layer 34, liquid crystal layer 34 acts as an optical rotator having a Jones matrix of $$\begin{pmatrix} \cos\Phi & -\sin\Phi \\ \sin\Phi & \cos\Phi \end{pmatrix},$$

which turns the light $$\begin{pmatrix} 1 \\ 0 \end{pmatrix} \text{ into } \begin{pmatrix} \cos\Phi & -\sin\Phi \\ \sin\Phi & \cos\Phi \end{pmatrix} \begin{pmatrix} 1 \\ 0 \end{pmatrix} = \begin{pmatrix} \cos\Phi \\ \sin\Phi \end{pmatrix},$$

linearly polarized light directed along the twist angle direction at the rear of layer 34. The light is then reflected by the reflective layer 44 and passes back through liquid crystal layer 34 a second time. The liquid crystal layer 34 continues to act as a rotator in an opposite sense that can be expressed as $$\begin{pmatrix} \cos\Phi & \sin\Phi \\ -\sin\Phi & \cos\Phi \end{pmatrix}.$$

Thus, the liquid crystal layer turns the light $$\begin{pmatrix} \cos\alpha \\ \sin\alpha \end{pmatrix} \text{ into } \begin{pmatrix} \cos\Phi & \sin\Phi \\ -\sin\Phi & \cos\Phi \end{pmatrix} \begin{pmatrix} \cos\Phi \\ \sin\Phi \end{pmatrix} = \begin{pmatrix} 1 \\ 0 \end{pmatrix}.$$

The light at this point is consistent with the light polarized by polarizing layer 42 so that this light passes through polarizer 42 causing the liquid crystal device 30 to appear bright. Accordingly, the Jones matrix of the liquid crystal layer 32 in conjunction with the reflective layer 44 is as follows $$\begin{pmatrix} \cos\Phi & \sin\Phi \\ -\sin\Phi & \cos\Phi \end{pmatrix} \begin{pmatrix} \cos\Phi & -\sin\Phi \\ \sin\Phi & \cos\Phi \end{pmatrix} = \begin{pmatrix} 1 & 0 \\ 0 & 1 \end{pmatrix}.$$

In essence, liquid crystal layer 32 acts as a rotator twice, but in opposite senses.

Referring now to the operation of liquid crystal device 30 in a field-on state, it should first be noted that when the electric field applied between electrodes 38 is less than the threshold voltage, no apparent change of light intensity occurs. Once the applied electric field is greater than the threshold voltage, approximately at the saturation voltage, the orientation of the liquid crystal molecules are tilted and the liquid crystal layer turns the incident, linearly polarized light into an elliptically polarized light at the rear of the liquid crystal layer. The light reflected by reflective layer 44 is then turned back into a linearly polarizing light as it passes through liquid crystal layer 34 a second time. However, the polarization direction of the light is rotated by 90° with respect to its orientation before entering the liquid crystal layer 34 the first time. Thus, the light is blocked by the polarizer 42, making the device appear dark at its viewing surface 48.

At the saturation voltage, the liquid crystal layer 34, together with reflective layer 44, acts as a half-wavelength plate with its fast axis rotated by π/4 with respect to the original polarization direction of polarizer 42. The Jones matrix of the liquid crystal layer 34 and reflective layer 44 is $$\begin{pmatrix} 0 & 1 \\ 1 & 0 \end{pmatrix}$$

which turns linearly polarized light $$\begin{pmatrix} 1 \\ 0 \end{pmatrix}$$

into a linearly polarizing light $$\begin{pmatrix} 0 \\ 1 \end{pmatrix}.$$

Figure 1A:
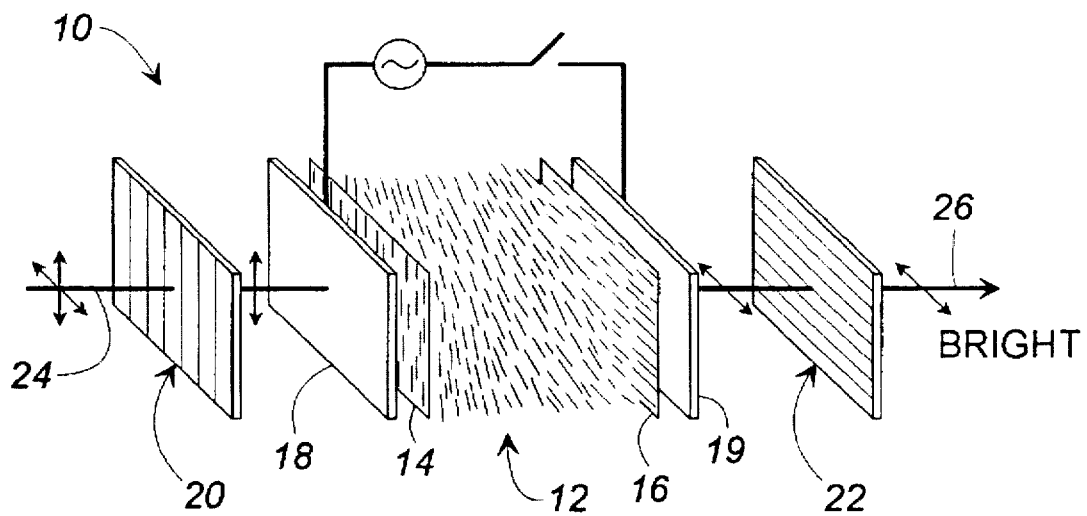
FIGS. 1A–1B are perspective views illustrating a prior art transmissive nematic liquid crystal device with and without an electric field applied.
Figure 1B:
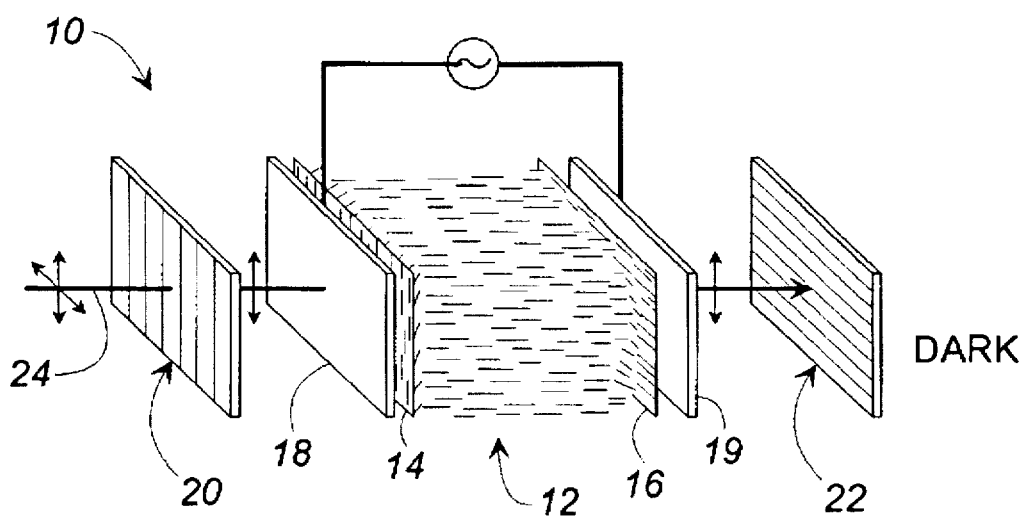

Therefore, liquid crystal layer 34 can be characterized as an optical rotator below the optical threshold voltage, and as a half-wavelength plate at the saturation voltage. When the applied voltage is greater than the saturation voltage, the liquid crystal molecules of liquid crystal layer 34 rotate in the direction of the electric energy as illustrated in FIG. 1B. In this state, light passing through uniaxial liquid crystal layer 34 is transmitted unchanged.

Figure 7:
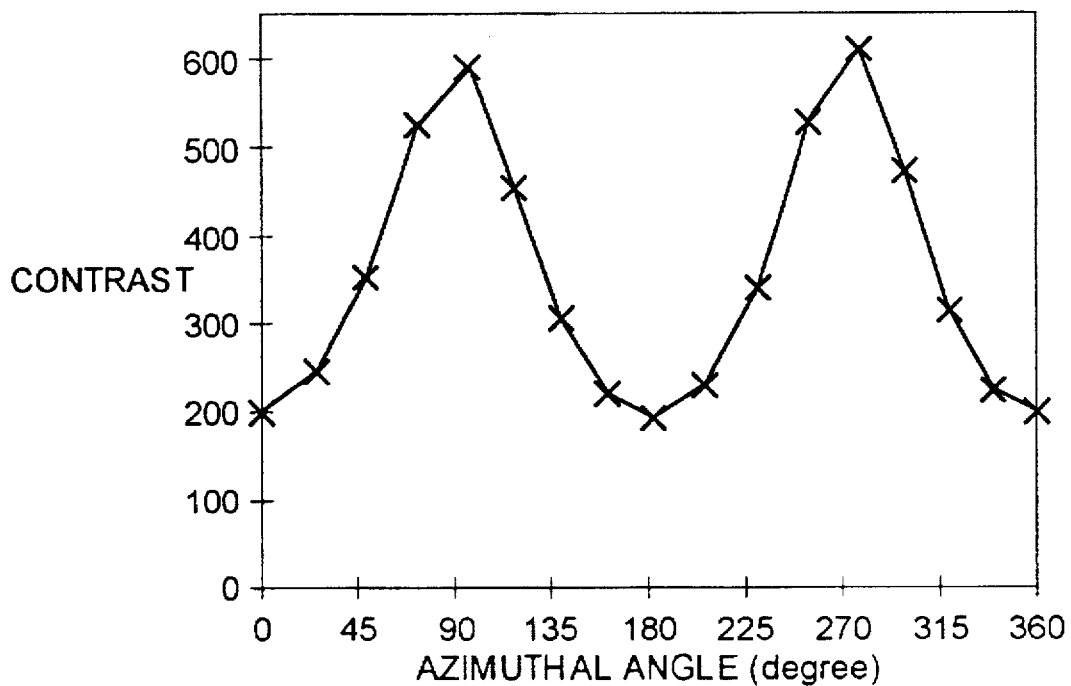
FIG. 7 is a graph of contrast at a tilt angle of 10° for the liquid crystal device of FIG. 2.
Figure 8:
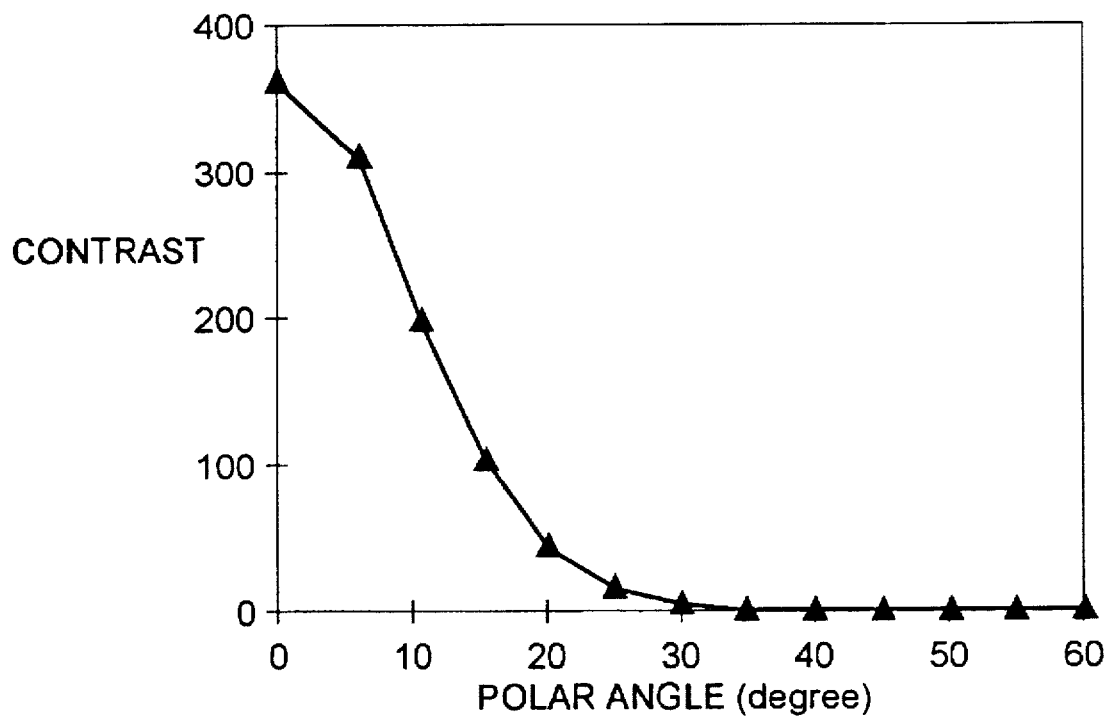
FIG. 8 is a graph of contrast at varying tilt angles for the liquid crystal device of FIG. 2.

Further performance characteristics of liquid crystal display 30 are graphically illustrated in FIGS. 7 and 8. FIG. 7 is a view angle plot of the contrast of liquid crystal device 30 as a function of the azimuthal angle of view direction, with the tilt angle being θ=10°. FIG. 8 is a view angle plot of the contrast of the liquid crystal device 30 as a function of the fit angle with the azimuthal angle being ψ=0°.

ALTERNATIVE EMBODIMENTS

Figure 9:
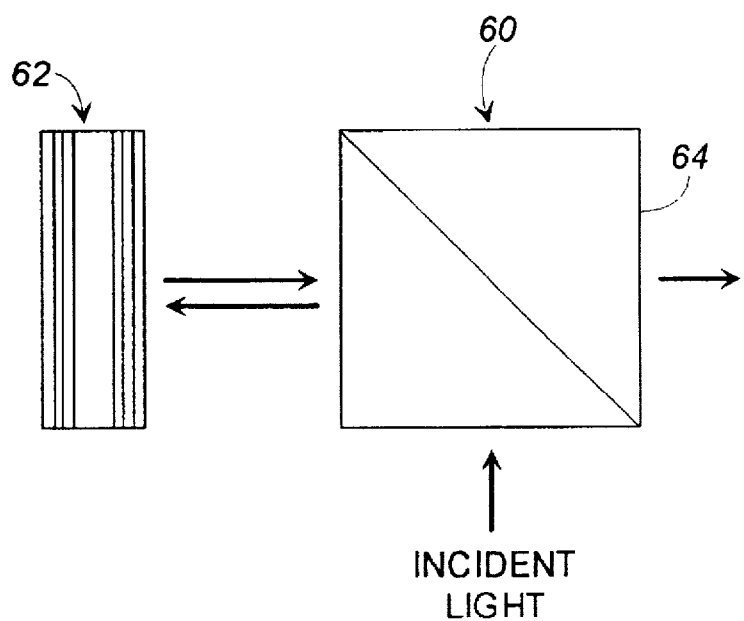
FIG. 9 is a schematic illustration of the liquid crystal device of FIG. 2 operating in negative mode.

As previously mentioned, liquid crystal device 30 is capable of operating as a negative mode display when operated in conjunction with a polarizing beam splitter 60. As illustrated in FIG. 9, the beam splitter 60 is disposed adjacent to the viewing surface of a SBTN-LCD 62 having the polarizing layer 42 removed. Therefore, incident light is polarized by beam splitter 60 and is redirected into device 62 by beam splitter 60. The light enters liquid crystal device 62 and then reflects off its rear reflective surface back toward beam splitter 60. At beam splitter 60, the reflected light is either transmitted to viewing surface 64 or redirected back to the light source, depending on the direction of its polarization. In the field-off state, as described above, the polarization direction of the light is unchanged by liquid crystal device 62 so the reflected light is redirected by beam splitter 60 back toward the light source, and thus, the device appears black at the viewing surface 64. In the field-on state, as also described above, the polarization direction of the reflected light is rotated 90°. Thus, the reflected light is transmitted by beam splitter 60 and the device appears bright at viewing surface 64. Accordingly, the display operates in a negative mode, i.e., white on black background.

Figure 10:
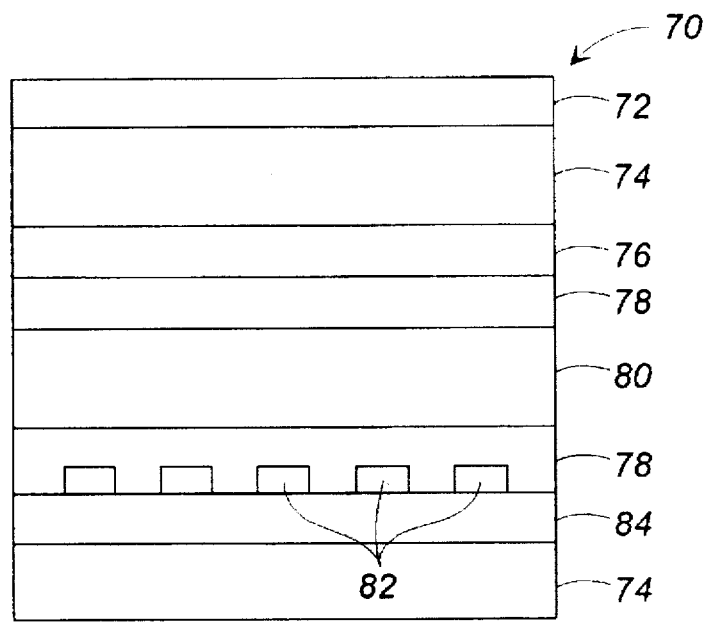
FIG. 10 is a plan view of the structural layers of a SBTN-LCD device in accordance with the present invention and configured as a full-color display.

In addition, a liquid crystal display in accordance with the present invention can be operated as a color display device 70, as illustrated in FIG. 10. Display 70 comprises a polarizer 72, glass plates 74, electrode layer 76, front and rear orientation layers 78, a liquid crystal layer 80, color filters 82, and a conductive reflective layer 84. As with liquid crystal device 30, color liquid crystal device 70 can be disposed upon a rear substrate (not shown), such as a glass plate or silicon wafer. The color filters 82 comprise RBG mosaic patterns and are mounted on the inner, or front, surface of the reflective layer 84 in the passive display as shown, or, as in most cases, mounted on the inner, or front, surface of glass plate 74 in an active matrix display where an active TFT matrix is fabricated on glass plate 74 on the rear substrate. The color filters preferably have a one to one correspondence to each liquid crystal pixel electrode. In the active matrix display, each pixel is addressed with a TFT switch. In the aforementioned color display configuration, because a second polarizing layer is not required, device 70 avoids pattern shadows associated with other conventional color displays.

As mentioned hereinbefore, conventional notebook computers typically utilize color STN-LCDs or color TFT active matrix TN-LCDs, both of which operate in a transmissive mode. A constant backlight illumination is needed in these displays which is very battery consuming. However, these displays work exceptionally well in environments with little ambient light. In comparison, a device using reflective SBTN-LCDs in accordance with the present invention uses much less power and works well in environments with ample ambient light but is not as well suited for operation in environments where ambient light is limited, i.e., in darkness.

Figure 11:
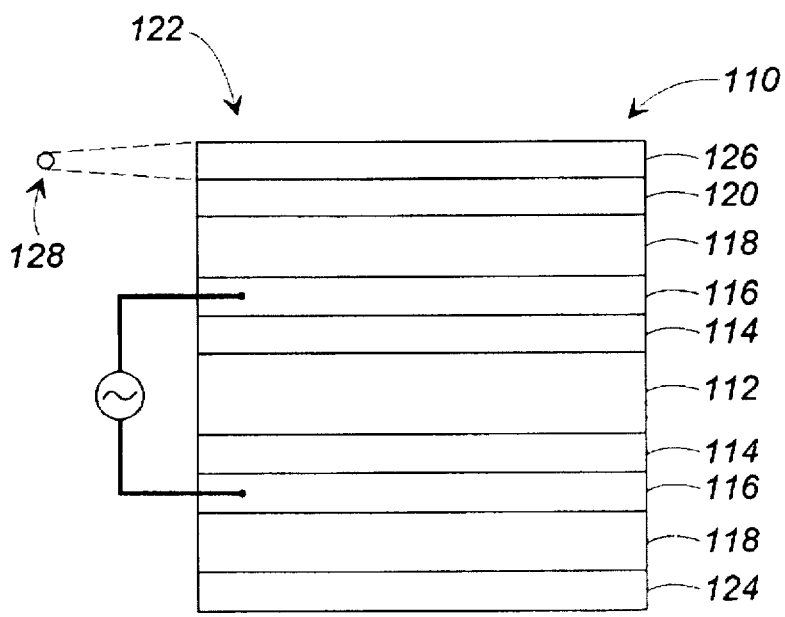
FIG. 11 is a plan view of the structural layers of a SBTN-LCD device in accordance with the present invention, configured for reflective mode operation and including a front light film.

In order to enable the operation of a reflective SBTN-LCD in an environment with little to no ambient light, a transparent frontlight film, such as that disclosed in Tai et al., "A Transparent Frontlighting System," SID 95 Digest, pp. 375–378 (1995), can be installed adjacent to the outside surface of the polarizer at the viewing surface, as illustrated in FIG. 11. In the frontlight SBTN-LCD device 110 shown in FIG. 11, a liquid crystal layer 112 is sandwiched between two orientation layers 114, two transparent electrodes 116, and two glass plates 118. A polarizer 120 is positioned adjacent to front or viewing surface 122 of the front glass plate 118 with its polarization axis being parallel (or perpendicular) to the immediate neighboring liquid crystal molecules in liquid crystal layer 112 at front orientation layer 114, as discussed in detail with reference to the previous embodiments of the present invention. A reflective layer 124 is positioned adjacent to the rear glass plate 118 and a transparent frontlight film 126 is incorporated adjacent to the outside surface of polarizer 120. In communication with frontlight film 126 is a light source 128 for providing light rays for illuminating device 110. In operation, i.e., when the light source 128 is actuated, frontlight film 126 redirects the light rays from light source 128 toward reflective layer 124. The light is reflected back by reflective layer 124 and passes through the transparent frontlight film 126. When light source 128 is not actuated, frontlight film 126 is transparent and does not affect ambient incident light. The frontlight SBTN-LCD device 110 is more economical and the batteries in portable notebook computers equipped with such frontlighting SBTN-LCDs are expected to work for a much longer time.

Figure 12:
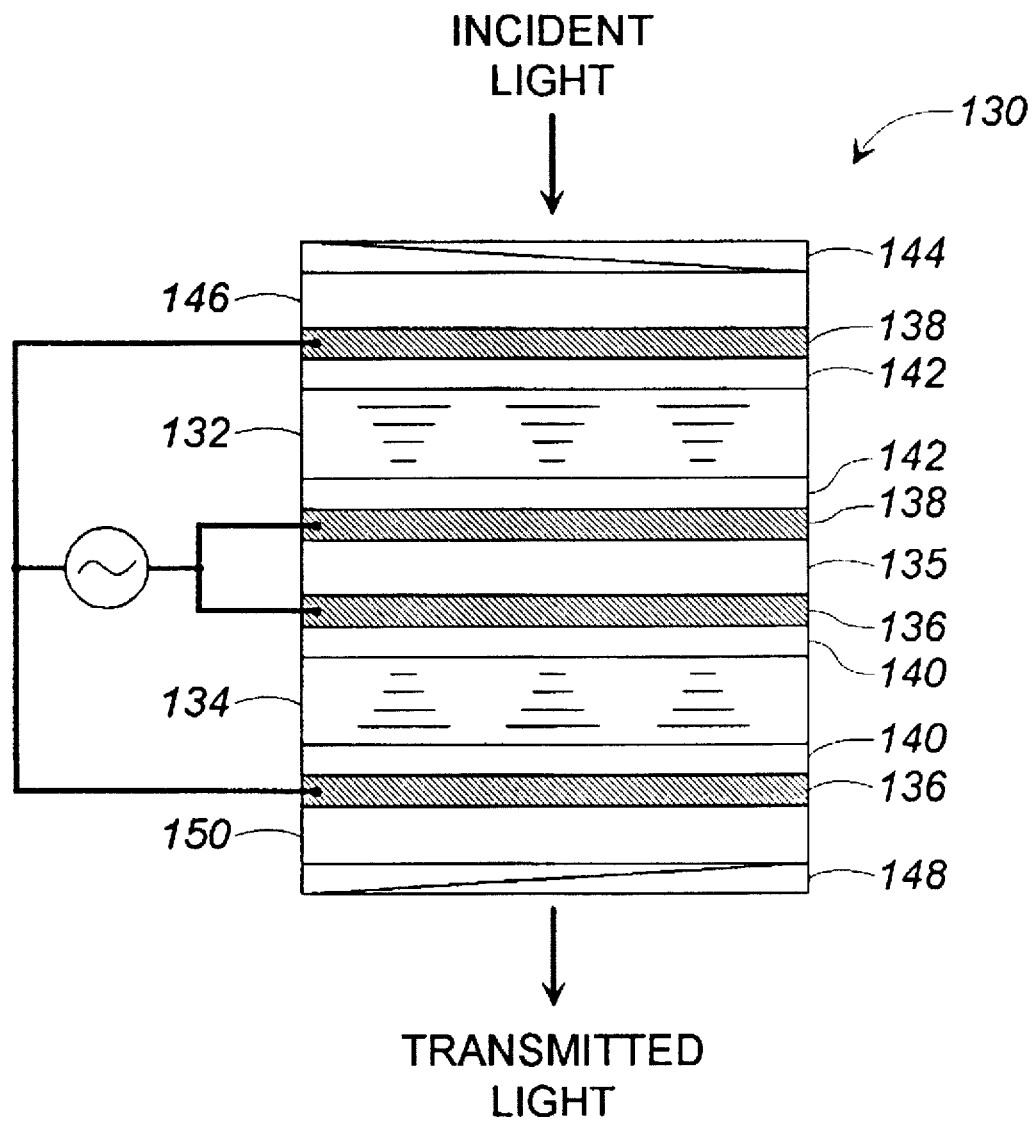
FIG. 12 is a plan view of the structural layers of a SBTN-LCD in accordance with the present invention and configured for transmissive mode operation.

Further, the present invention is also capable of operating in a transmissive mode. In order for a SBTN-LCD to operate in a transmissive mode, a double LCD configuration, as shown in FIG. 12, is required. In the double LCD layer SBTN-LCD device 130, two substantially identical liquid crystal layers 132, 134, separated by a control glass plate 135 and having opposite sense of twist, are laid over one another. Two pairs of transparent electrodes 136, 138 sandwich respective liquid crystal layers 134 and 132. Likewise, two pair of orientation layers 140, 142 are deposited between respective electrode pairs 136, 138 and corresponding liquid crystal layers 134, 132. An entrance polarizer 144 is positioned adjacent to the outside surface of a front glass plate 146 of the device. A second polarizer 148 is incorporated adjacent to the outside surface of a rear glass plate 150 of the device with its polarization axis either parallel (forming a positive mode display) or perpendicular (forming a negative mode display) to the polarization axis of entrance polarizer 144. For purposes of the following discussion, it is assumed that liquid crystal device 130 operates as a positive mode display.

In the field-off state, both liquid crystal layers 132, 134 operate as optical rotators of an angle equal to their twisted angle but of opposite sense with respect to one another. A linearly polarized light is kept as linearly polarized light as it passes through the two liquid crystal layers 132, 134 and the polarization of an exiting linearly polarized light is along its original direction. If the exit polarizer 148 is placed such that its polarization axis is parallel to that of the entrance polarizer 144, the device appears bright.

In the field-on state, an electric field is applied simultaneously across electrodes 138 of liquid crystal layer 132 and electrodes 136 of liquid crystal layer 134. At the saturation voltage, the liquid crystal layers act as half-wavelength plates turning the incident, linearly polarized light into a new linearly polarized light with a polarization direction offset 90 degrees as described above. Thus, the light is blocked by the exit polarizer 148 and the device appears dark. In this configuration, the device is a positive display.

In concluding the detailed description, it should be noted that it will be obvious to those skilled in the art that many variations and modifications may be made to the preferred embodiments without substantially departing from the principles of the present invention. All such variations and modifications are intended to be included herein within the scope of the present invention, as set forth in the following claims. Further, in the claims hereafter, the corresponding structures, materials, acts, and equivalents of all means or step-plus-function elements are intended to include any structure, material, or act for performing the functions and combination with other claimed elements as specifically claimed.

Wherefore, the following is claimed:

1. A sub-twisted nematic liquid crystal device, comprising:

a liquid crystal layer characterized as a polarization rotator below an optical threshold voltage, a λ/2 plate at approximately a saturation voltage, and a uniaxial transparent layer above said saturation voltage;

a first electrode layer and a second electrode layer, said electrode layers sandwiching said liquid crystal layer and configured to create an electric field across said liquid crystal layer, said first and second electrode layers substantially transparent to incident visible light;

orientation means for imparting a twist angle to said liquid crystal layer;

reflecting means positioned adjacent said first electrode layer for reflecting light that passes from said liquid crystal layer back through said liquid crystal layer; and a polarizing film adjacent said second electrode layer for converting incident light into linearly polarized light.

2. The sub-twisted nematic liquid crystal device defined in claim 1, and wherein said twist angle is approximately 55°, and a product of a birefringence and thickness of said liquid crystal layer is approximately 0.52 microns.

3. The sub-twisted nematic liquid crystal device defined in claim 1, and wherein said twist angle is between 46 to 89 degrees.

4. The sub-twisted nematic liquid crystal device defined in claim 1, and wherein the product of the birefringence and thickness of said liquid crystal layer is between 0.35 to 0.7 μm.

5. The sub-twisted nematic liquid crystal device defined in claim 1, and wherein said orientation means is incorporated in said first and second electrode layers.

6. The sub-twisted nematic liquid crystal device defined in claim 1, and wherein said reflecting means is incorporated in said first electrode layer.

7. The sub-twisted nematic liquid crystal device defined in claim 1, and wherein said polarizing film has a polarization axis parallel to a neighboring liquid crystal orientation defined by said orientation means.

8. The sub-twisted nematic liquid crystal device defined in claim 1, and wherein said polarizing film has a polarization axis perpendicular to a neighboring liquid crystal orientation defined by said orientation means.

9. The sub-twisted nematic liquid crystal device defined in claim 1, and wherein said device is a reflection type device operating in a positive mode.

10. The sub-twisted nematic liquid crystal device defined in claim 1, and wherein said optical threshold voltage is approximately 1–2 volts and said saturation voltage is approximately 0.1–0.6 volts greater than said optical threshold voltage.

11. The sub-twisted nematic liquid crystal device defined in claim 1, and further comprising a substrate upon which said device is deposited, said substrate including driver circuitry for controlling the actuation of said device.

12. The sub-twisted nematic liquid crystal device defined in claim 1, and further including a color filter disposed between said liquid crystal layer and said reflecting means.

13. The sub-twisted nematic liquid crystal device defined in claim 12, wherein said color filter includes RBG mosaic patterns.

14. The sub-twisted nematic liquid crystal device defined in claim 1, and further including a transparent frontlight film positioned adjacent said polarizing film for redirecting light into said device.

15. The sub-twisted nematic liquid crystal device defined in claim 14, and wherein said frontlight film includes a light source for producing light when selectively actuated.

16. The sub-twisted nematic liquid crystal device defined in claim 1, and wherein said polarizing film comprises a beam splitter so that said device operates in a negative mode.

17. In a liquid crystal device for use in a display having a polarizer for polarizing light entering the device, a first and a second electrode layers positioned about a liquid crystal layer for creating an electric field across the liquid crystal layer, and a reflective layer at a rear of the device for redirecting light towards a front of the device, wherein an improvement comprises the liquid crystal layer being characterized as a polarization rotator below an optical threshold voltage, a λ/2 plate at approximately a saturation voltage, and a uniaxial transparent layer above said saturation voltage.

18. The liquid crystal device of claim 17, and further comprising orientation means for imparting a twist angle between 46 to 89 degrees.

19. The liquid crystal device of claim 17, and wherein the product of the birefringence and thickness of said liquid crystal layer is between 0.35 to 0.7 micrometers.

20. The liquid crystal device of claim 17, and wherein said optical threshold voltage is approximately 1–2 volts and said saturation voltage is approximately 0.1 to 0.6 volts greater than said optical threshold voltage.

21. The liquid crystal device of claim 17, and further including a color filter disposed between said liquid crystal layer and said reflective layer.

22. A sub-twisted nematic liquid crystal device capable of operating in a transmissive mode, comprising:

a first liquid crystal cell including,
 (a) a first liquid crystal layer characterized as a polarization rotator having a first offset angle below an optical threshold voltage, a $\lambda/2$ plate at approximately a saturation voltage, and a transparent layer above said saturation voltage,
 (b) a first orientation means for imparting a twist angle to said first liquid crystal layer, and
 (c) a first pair of electrode layers sandwiching said first liquid crystal layer and configured to create an electric field across said first liquid crystal layer;

a second liquid crystal cell including:
 (a) a second liquid crystal layer characterized as a polarization rotator having a second offset angle below said optic threshold voltage, a $\lambda/2$ plate at approximately said saturation voltage, and a transparent layer above said saturation voltage,
 (b) a second orientation means for imparting a twisting of two said liquid crystal layers, and
 (c) a second pair of electrode layers sandwiching said second liquid crystal layer and configured to create an electric field across said second liquid crystal layer;

said first liquid crystal cell being positioned adjacent to said second liquid crystal cell and separated by a first glass plate;

a front glass plate and a rear glass plate sandwiching said first liquid crystal cell and second liquid crystal cell;

a first polarizing film adjacent said front glass plate for converting incident light into linearly polarized light; and a second polarizing film adjacent said rear glass plate for transmitting linearly polarized light polarized in the direction of said second polarizing film.

\* \* \* \* \*